United States Patent
Brodersen et al.

(10) Patent No.: US 7,211,753 B2
(45) Date of Patent: May 1, 2007

(54) VEHICLE SEAT ASSEMBLY WITH OPERATOR PRESENCE SWITCH

(75) Inventors: Cole T. Brodersen, Davenport, IA (US); William Tuman, Colona, IL (US)

(73) Assignee: Sears Manufacturing Co., Davenport, IA (US)

( * ) Notice: Subject to any disclaimer, the term of this patent is extended or adjusted under 35 U.S.C. 154(b) by 179 days.

(21) Appl. No.: 10/994,889

(22) Filed: Nov. 22, 2004

(65) Prior Publication Data

US 2006/0107766 A1    May 25, 2006

(51) Int. Cl.
    *H01H 3/02*    (2006.01)
(52) U.S. Cl. .................................. 200/85 A; 200/52 R
(58) Field of Classification Search .............. 200/85 A, 200/52 R, 332; 340/666–668
    See application file for complete search history.

(56) References Cited

U.S. PATENT DOCUMENTS

| | | | |
|---|---|---|---|
| 3,703,618 A * | 11/1972 | Lewis ....................... 200/85 A |
| 4,629,248 A * | 12/1986 | Mawbey ................ 297/284.11 |
| 4,795,865 A * | 1/1989 | Howard .................... 200/85 A |
| 4,969,533 A * | 11/1990 | Holm et al. ................. 180/273 |
| 5,124,512 A | 6/1992 | Huettner |
| 5,146,054 A | 9/1992 | Etters |
| 5,419,614 A * | 5/1995 | Richards et al. ........ 297/284.11 |
| 5,424,502 A * | 6/1995 | Williams ................... 200/85 A |
| 5,474,353 A * | 12/1995 | Koester et al. .......... 296/65.07 |
| 5,502,284 A * | 3/1996 | Meiller et al. ............ 200/85 A |
| 5,507,560 A | 4/1996 | Frusti |
| 5,558,386 A * | 9/1996 | Tilly et al. ................ 296/65.05 |
| 5,676,336 A * | 10/1997 | Nefy et al. ............. 244/122 R |
| 6,079,738 A | 6/2000 | Lotito |
| 6,161,891 A | 12/2000 | Blakesley |
| 6,359,245 B1 * | 3/2002 | Wahls ....................... 200/52 R |
| 6,428,095 B1 | 8/2002 | Hirata |
| 6,457,545 B1 * | 10/2002 | Michaud et al. ............ 180/272 |
| 6,879,261 B2 * | 4/2005 | Nishino et al. ............. 340/666 |
| 7,053,759 B2 * | 5/2006 | Kennedy et al. ............ 340/438 |
| 7,079,016 B2 * | 7/2006 | Ho et al. .............. 340/426.285 |

\* cited by examiner

*Primary Examiner*—Elvin Enad
*Assistant Examiner*—Lisa Klaus
(74) *Attorney, Agent, or Firm*—Niro, Scavone, Haller & Niro

(57) ABSTRACT

The present invention is directed to a vehicle seat assembly comprising a seat support pan, a seat cushion, a spring biased lever and an operator present switch. Both the lever and the switch are located between the cushion and the pan, effectively integrated within the seat. The lever is movable between upper and lower positions, with its associated spring biasing the lever toward its upper position. The switch is designed and located so that all of its components are housed within the support pan and none of these components extends below or outside of the pan. When the seat is occupied, the occupant's weight depresses the cushion and, in turn, the lever moves against the force of the spring toward its lower position and the switch is actuated. Because the switch is located completely within the seat cushion, the seat assembly's vertical dimension or envelope is minimized and the design of the seat support and/or suspension located below the seat pan is simplified.

5 Claims, 3 Drawing Sheets

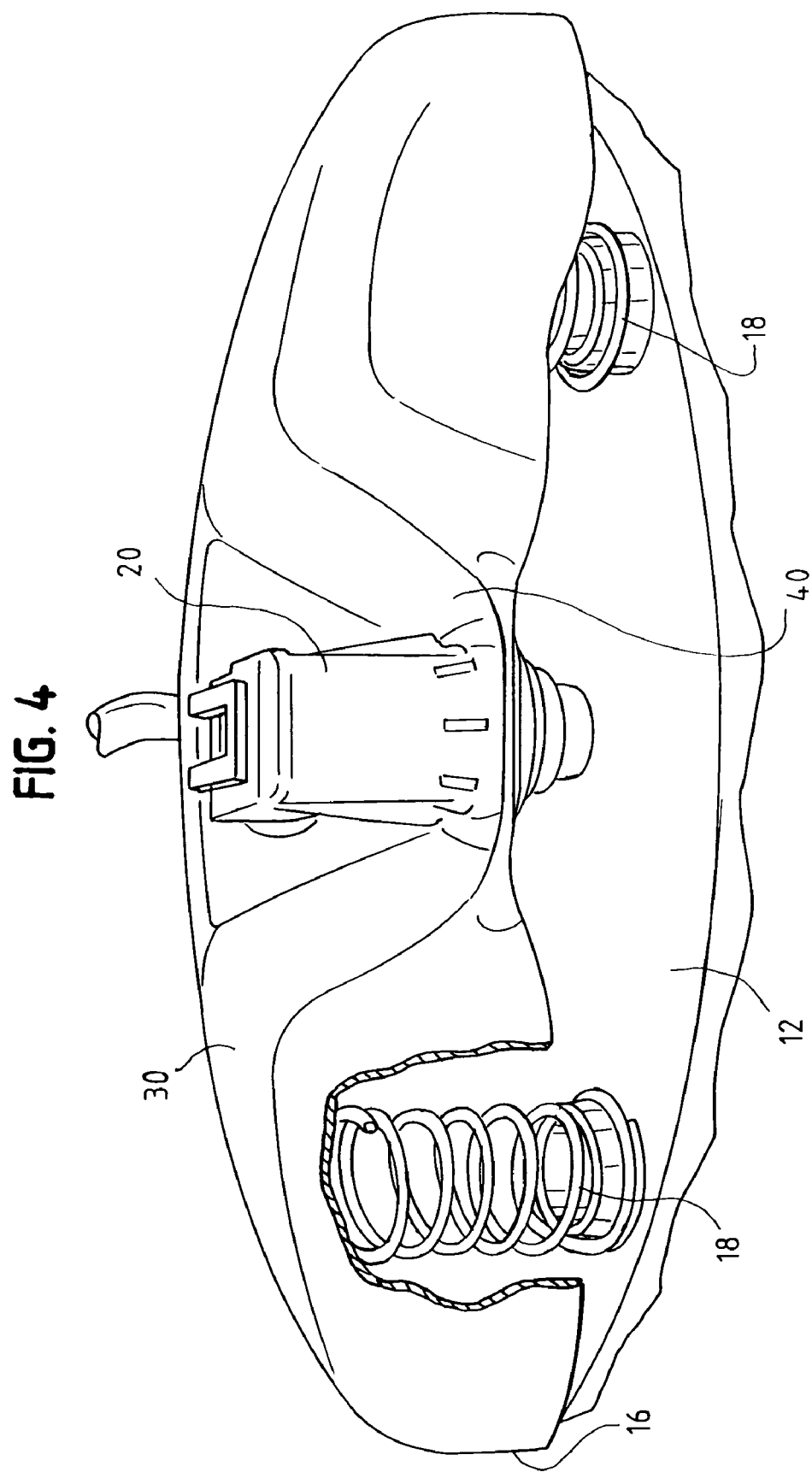

VEHICLE SEAT ASSEMBLY WITH OPERATOR PRESENCE SWITCH

BACKGROUND OF THE INVENTION

The present invention relates generally to vehicular seating and, more particularly, to vehicle seating having an integrated safety device sensing the presence of an occupant of the seat.

It is well known that a variety of different vehicle systems or functions should be operational when there is an operator or passenger occupying the vehicle seats. By way of example, the vehicle personal restraint equipment (i.e. seat belts) should be in use when the vehicle is in use. Other vehicle systems or functions are desirably disabled when the driver or operator of the vehicle leaves the driving seat. This is particularly true in off road equipment, such as construction, grading or farming vehicles.

Many different so called "operator present switches" have been in use for these purposes and have proven to be quite effective. Nonetheless, the existing operator present switches ("OP switches") do suffer from some disadvantages. For example, OP switches generally are located below the seat and may interfere with seat support or suspension components. In addition, the arrangement of the OP switch and other seat assembly components may require additional space which is a design constraint when faced with the smaller interiors of new model vehicles.

Therefore, a need exists for a small, mechanically simple and inexpensive OP switch that is integrated into the seat itself without any components extending beyond the seat cushion or support pan structures. In addition, it is desirable that such an integrated OP switch be designed to operated properly with the occupant of the seat positioned at any part of the seat and yet not be so intrusive so that the occupant can feel the presence of the switch or its related hardware.

SUMMARY OF THE INVENTION

The present invention is directed to a vehicle seat assembly comprising a seat support pan, a seat cushion, a spring biased lever and an operator present switch. Both the lever and the switch are located between the cushion and the pan, effectively integrated within the seat. The lever is movable between upper and lower positions, with its associated spring biasing the lever toward its upper position. The switch is designed and located so that all of its components are housed within the support pan and none of these components extends below or outside of the pan. When the seat is occupied, the occupant's weight depresses the cushion and, in turn, the lever moves against the force of the spring toward its lower position and the switch is actuated. Because the switch is located completely within the seat cushion, the seat assembly's vertical dimension or envelope is minimized and the design of the seat support and/or suspension located below the seat pan is simplified.

In accordance with one preferred embodiment of the invention, the lever comprises a broad paddle shape and is pivotally connected at one end to the seat support pan. In this embodiment, the lever has a cushion engaging upper surface that extends over a substantial portion of the area of the seat cushion. A recess in the lever is sized to accommodate placement of the OP switch and includes an aperture for assembly of the switch to the lever and an opening for passage of the switch wiring.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 4 is a front perspective view, in partial cross section, showing further details of construction of the embodiment of FIG. 1.

DETAILED DESCRIPTION OF THE PREFERRED EMBODIMENTS

Figure 1:
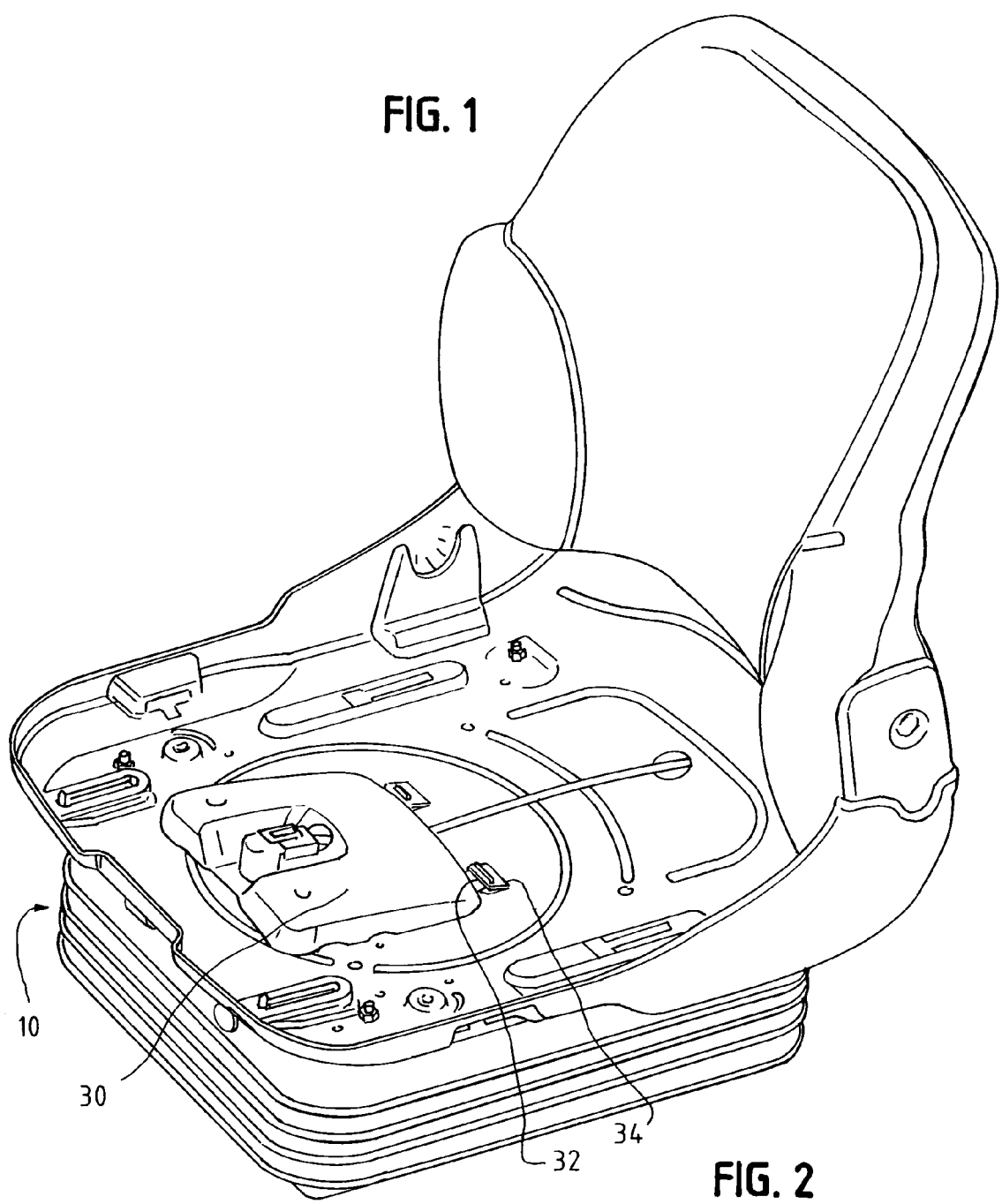
FIG. 1 is a perspective view illustrating one embodiment of the present invention with the seat cushion removed to show the arrangement of internal components.
Figure 2:
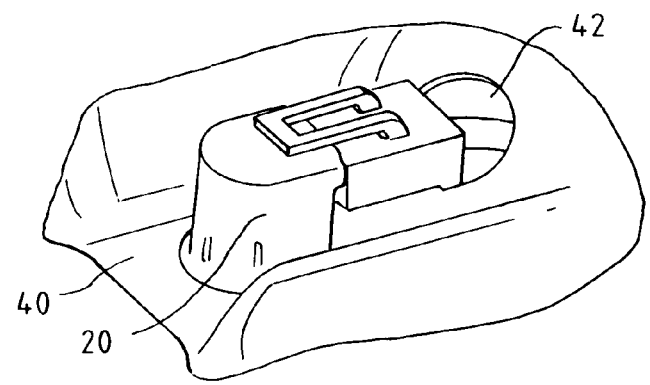
FIG. 2 is a partial perspective view showing details relating to the position and arrangement of the OP switch as used in the embodiment illustrated in FIG. 1.

One preferred vehicle seat assembly that embodies the present invention is illustrated in the drawing and designated generally as 10. The seat assembly 10 includes a seat cushion support pan 12, a seat cushion 14, a switch actuation lever 16, at least one and preferably two springs 18, and an OP switch 20.

Figure 3:
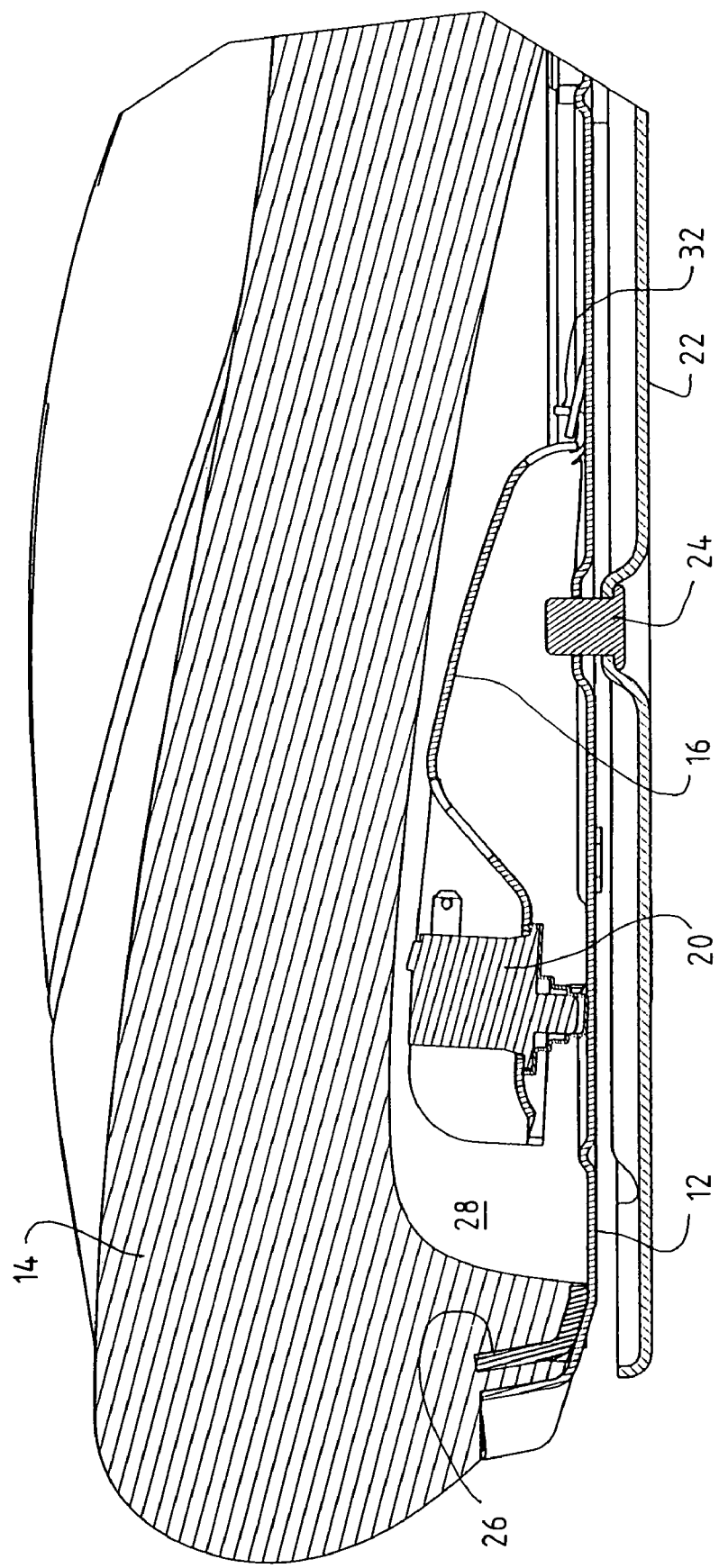
FIG. 3 is a partial cross sectional view illustrating the arrangement of the seat cushion, OP switch, actuating lever and seat cushion support pan used in the embodiment of FIG. 1.

The seat cushion support pan 12 is of conventional design and adapted for mounting to a seat suspension assembly. The pan 12 may be constructed from sheet metal or high strength plastic and preferably has a size and configuration to receive the seat cushion 14 in a snug or press fit manner. In the embodiment illustrated in FIG. 3, the seat cushion support pan 12 is mounted to the upper housing 22 of a conventional seat suspension assembly via a central swivel 24 which allows the seat to rotate horizontally in a manner well known in the art.

The seat cushion 14 is also of conventional design and construction, preferably made from foamed polyurethane resin. The cushion 14 may have an insert 26 located adjacent its lower periphery to assist in maintaining the shape of the cushion and in retaining any cover which is upholstered to the cushion. In addition, the cushion 14 is provided with a chamber 28 located along its bottom to accommodate the switch and lever components of the assembly.

The lever 16 preferably comprised of a paddle having a broad cushion engaging surface 30. The term "paddle" is used here to mean any structure having a relatively broad surface relative to its thickness such as, for example, plates, panels, grills and gratings. It is desirable that the cushion engaging surface has dimensions of length and width in the range of about one-third to one-half the respective dimensions of length and width of the cushion 14. This insures that the presence of the operator even on a side or front edge of the seat will be sensed. Moreover, it is preferred that sharp corners or edges be avoided in the design of the lever to minimize the "feel" of the device with the cushion by the seat occupant. The lever 16 is pivotally mounted to the support pan 12 via tabs 32 cooperating with slots 34 in the pan. In this way the lever 16 may move between upper and lower positions in accordance with the operation of the invention. At least one and preferably two springs 18 are employed to bias the lever 16 toward its upper position.

While compression springs are illustrated in the drawings, leaf or torsion springs or other biasing mechanisms and devices well known to those skilled in the art may be employed in the practice of the invention.

The OP switch 20 is also a conventional device having a button actuator 36 which abuts the cushion support pan 12. In the practice of the present invention, the OP switch has all of its components, including the button actuator located above the support pan 12. In other words, there are no switch components that extend through or below the support pan. This simplifies the design of the components located immediately below the support pan, such as the upper housing 22, since the OP switch does not interfere with their operation. The present design also minimizes the vertical envelope dimension of the seat assembly 10.

As shown in the preferred embodiment, the lever 16 may have a recess 40 at its distal end. The recess has a size sufficient to accommodate the proper positioning of the switch 20 and results in the cushion engaging surface having a generally U-shaped configuration. The recess 40 is provided with an aperture into which the switch may be press fit or snap fit. The recess 40 also includes an opening 42 for passage of the wiring to the switch. It is also desirable to cover the switch actuator with an flexible boot to prevent moisture or water damage to the switch or switch circuitry.

In operation, the chamber 28 has a vertical dimension sufficient so that when the seat is not occupied the springs 18 can bias the lever 16 to its upper position and the switch 20 is inactive. However, when the seat is occupied, the weight of the occupant depresses the cushion and moves the lever, against the biasing action of the springs, toward the lever's lower position, causing the switch to engage the support pan and depress the button actuator.

As illustrated, it is preferred that the lever 14 be located toward the front of the seat cushion and, most preferably, extending from a base end near the center of the seat toward the front of the seat. It is also preferred to employ the illustrated paddle lever having a forward recess for positioning of the switch and the placement of each spring on opposite sides of the switch adjacent the recess.

It will be appreciated by those skilled in the art that various changes and modifications can be made to the illustrated embodiments without departing from the spirit of the present invention. All such modifications and changes are intended to be covered by the appended claims.

We claim:

1. A vehicle seat assembly, comprising:
   a seat cushion support pan;
   a seat cushion;
   a lever located between the pan and cushion, said lever being movable between upper and lower positions and having a broad cushion engaging surface with a recess;
   a spring operable to bias the lever toward the upper position; and
   an operator present switch also located between the pan and cushion and within the lever recess, said switch having no components extending below the pan and being actuated by movement of the lever toward the lower position;
   whereby upon occupation of the seat by an operator, the lever moves against the bias of the spring toward the lower position and the switch is actuated.

2. The vehicle seat assembly of claim 1 wherein the cushion engaging surface is generally u-shaped and has a base pivotally connected to the pan.

3. The vehicle seat assembly of claim 2 wherein two springs are disposed between the pan and lever, each of the springs positioned below one leg of the u-shaped cushion engaging surface.

4. The vehicle seat assembly of claim 1 wherein said recess includes a switch aperture and the switch is mounted within said aperture.

5. The vehicle seat assembly of claim 4 wherein said recess has an opening to accommodate wiring for the switch.

* * * * *